(12) United States Patent
Dhara et al.

(10) Patent No.: US 9,886,664 B2
(45) Date of Patent: Feb. 6, 2018

(54) SYSTEM AND METHOD OF MESSAGE THREAD MANAGEMENT

(71) Applicant: Avaya Inc., Basking Ridge, NJ (US)

(72) Inventors: Krishna Kishore Dhara, Dayton, NJ (US); Venkatesh Krishnaswamy, Holmdel, NJ (US); Rudra Kant, Chas (IN)

(73) Assignee: Avaya Inc., Basking Ridge, NJ (US)

( * ) Notice: Subject to any disclaimer, the term of this patent is extended or adjusted under 35 U.S.C. 154(b) by 315 days.

(21) Appl. No.: 14/036,838

(22) Filed: Sep. 25, 2013

(65) Prior Publication Data

US 2015/0088784 A1 Mar. 26, 2015

(51) Int. Cl.
*H04L 12/58* (2006.01)
*G06N 5/02* (2006.01)

(52) U.S. Cl.
CPC .............. *G06N 5/02* (2013.01); *H04L 51/16* (2013.01); *H04L 51/26* (2013.01)

(58) Field of Classification Search
CPC ................................ H04L 51/16; H04L 51/26
See application file for complete search history.

(56) References Cited

U.S. PATENT DOCUMENTS

| | | | |
|---|---|---|---|
| 6,970,907 B1 | 11/2005 | Ullmann et al. | |
| 7,478,129 B1 * | 1/2009 | Chemtob | H04L 12/1827 709/204 |
| 8,788,602 B1 * | 7/2014 | Wan | H04L 51/24 709/206 |
| 9,544,204 B1 * | 1/2017 | Madhivanan | H04L 67/22 |
| 2005/0149622 A1 * | 7/2005 | Kirkland | H04L 51/04 709/207 |
| 2007/0050455 A1 * | 3/2007 | Yach | G06Q 10/109 709/206 |
| 2008/0109419 A1 * | 5/2008 | Murakami | G06F 17/30864 |
| 2008/0243835 A1 * | 10/2008 | Suzuki | G06F 17/30864 |
| 2008/0301250 A1 * | 12/2008 | Hardy | G06Q 10/107 709/207 |
| 2008/0307062 A1 * | 12/2008 | Wang | H04L 51/04 709/206 |
| 2009/0138828 A1 * | 5/2009 | Schultz | G06Q 10/10 715/853 |
| 2009/0234816 A1 * | 9/2009 | Armstrong | G06F 17/30728 |
| 2012/0124041 A1 * | 5/2012 | Bawri | G06Q 10/107 707/728 |
| 2012/0173632 A1 * | 7/2012 | Chakra | G06Q 10/107 709/206 |
| 2012/0221638 A1 * | 8/2012 | Edamadaka | G06Q 10/107 709/204 |

(Continued)

*Primary Examiner* — Jeong S Park
(74) *Attorney, Agent, or Firm* — Sheridan Ross P.C.

(57) ABSTRACT

Disclosed herein are systems, methods, and computer-readable storage device for managing message threads. An example system configured to practice this method can first identify a usage pattern of a user interacting with a message thread. Next, based on that usage pattern, the system can analyze messages in the message thread to identify a high-priority message. Then the system highlights the high-priority message when the system renders the message thread on a display. The messages can be email messages, text messages, instant messages, etc. The system can further associate the high-priority message with a repository, and grant a repository user, access to the high-priority message.

20 Claims, 11 Drawing Sheets

(56) References Cited

U.S. PATENT DOCUMENTS

| | | | | |
|---|---|---|---|---|
| 2012/0254325 | A1* | 10/2012 | Majeti | H04L 51/18 |
| | | | | 709/206 |
| 2012/0331079 | A1 | 12/2012 | Brown et al. | |
| 2013/0179514 | A1* | 7/2013 | Arora | H04L 51/24 |
| | | | | 709/206 |
| 2013/0212047 | A1* | 8/2013 | Lai | G06Q 10/107 |
| | | | | 706/12 |
| 2013/0346922 | A1* | 12/2013 | Shiplacoff | G06F 3/04842 |
| | | | | 715/835 |
| 2014/0096032 | A1* | 4/2014 | Mayblum | H04L 51/22 |
| | | | | 715/752 |
| 2014/0337590 | A1* | 11/2014 | Lemus | G06F 12/00 |
| | | | | 711/161 |

* cited by examiner

| | SENDER | SUBJECT | DATE △ | SIZE | |
|---|---|---|---|---|---|
| ▷ | MARY TYLER | EQUIPMENT RETURNED | 9/8/2012 | 11KB | |
| • | DANIEL DAY | RE)EQUIPMENT RETURNED | 9/8/2012 | 14KB | |
| • | JOSEPH GORDON | FOLLOW-UP ASSIGNMENT | 9/16/2012 | 98KB | 🖉 |
| | JAMIE LEE | QUARTERLY EVALUATION REMINDER! | 10/29/2012 | 44KB | |
| △ | JOSEPH GORDON | TAKE CARE OF THIS CUSTOMER PLEASE | 11/14/2012 | 21KB | |
| ▷ | PHILIP SEYMOUR | OUT OF SERVICE FOR 72 HOURS. PLEASE HELP! | 4/16/2013 | 13KB | |
| • | DANIEL DAY | RE)OUT OF SERVICE FOR 72 HOURS. PLEASE... | 4/17/2013 | 19KB | |
| • | JAMES EARL | SERVICE PERSONNEL DISPATCHED | 4/19/2013 | 12KB | |
| • | FRANCIS FORD | FIELD SERVICE REPORT | 4/21/2013 | 1.3MB | 🖉 |
| • | PHILIP SEYMOUR | LOG FILE | 4/21/2013 | 536KB | 🖉 |
| • | DANIEL DAY | RE)LOG FILE | 4/28/2013 | 31KB | |

FIG. 3

| | SUBJECT | SENDER | DATE | CATEGORY | TAGS | NOTES |
|---|---|---|---|---|---|---|
| | | | | | | |
| | 701a | 701b | 701c | 701d | 701e | 701f |
| 702a | EMERGENCY PROCEDURE OUTLINED | NEIL PATRICK | 6/21/2013 | GUIDELINE | EMERGENCY | |
| 702b | RE)HARRINGTON ACCOUNT | JOSEPH GORDON | 10/18/2011 | CUSTOMER | | |
| 702c | LOG FILE | PHILIP SEYMOUR | 4/21/2013 | ANALYSIS | LOG | |
| 702d | TIM'S OPINIONS | HELENA BONHAM | 8/9/2013 | GUIDELINE | EQUIPMENT | OBSOLETE AS OF 11/3 |
| 702e | RE)EQUIPMENT RETURNED | DANIEL DAY | 9/8/2012 | CUSTOMER | EQUIPMENT | USE THIS TEMPLATE |
| 702f | REVISED LAYOUTS | TOMMY LEE | 3/1/2009 | DESIGN | LAYOUT | |
| 702g | DESIGN CHANGES | MARY KAY | 8/15/2005 | DESIGN | | |
| 702h | CUSTOMER SATISFACTION | JOHN COUGAR | 5/5/2008 | CUSTOMER | EQUIPMENT | 2008 Q4 GOALS |
| 702i | ROOT OF THE PROBLEM | LOU DIAMOND | 7/17/2008 | ANALYSIS | | CHECK THIS FIRST! |
| | .... | .... | .... | .... | .... | .... |

*FIG. 7*

SYSTEM AND METHOD OF MESSAGE THREAD MANAGEMENT

BACKGROUND

1. Technical Field

The present disclosure relates to message thread management and more specifically to a system and method of highlighting high-priority messages and message threads.

2. Introduction

Modern personal communications still rely heavily on text-based modes of communication such as email, text messaging, instant messaging, etc. The text-based correspondence is often exchanged in several chunks over a period of time. For example, email correspondence between two individuals may consist of several email messages going back and forth between the two people for a few days, each message written in response to another. Such a burst of messages going back and forth may be closely related to each other and have a common topic. At a later time, the two individuals may exchange another burst of email messages over a different period of time to discuss a different topic.

These messages are typically stored and accessed through software applications that present virtual inboxes to the user. However, without a way to efficiently organize the messages that may have been exchanged over different periods of time and with different groups of people, it can be very difficult to sift through the inbox and find relevant messages. One common way to organize messages in an inbox is through a message thread. A message thread allows users to group related messages together for easier access.

The individual messages in a message thread are typically presented in simple chronological or reverse-chronological order. Although there are other ways to sort the messages such as by title or sender in alphabetical order, by size, etc., the traditional sorting methods are poor at taking into account how important, relevant, or useful each message may be to the user. In addition, traditional message inboxes offer limited ways for the user to alter the way the messages are presented. Although some email services have attempted to offer prioritization of messages in an inbox, their primary and limited focus has been on prioritizing newly arrived emails, often based on the identities of the senders, rather than messages in existing threads. Moreover, the existing systems only employ a bifurcated approach when it comes to message prioritization. In other words, there are only two priority levels for the messages—either high priority or low priority—with no varying degrees or shades of priority in between. Next, the "high-priority" messages are simply separated out from the rest of the messages and placed inside a separate "priority inbox." Finally, once placed inside this priority inbox, the messages are simply presented to the user in chronological order with no options for further organizing or prioritizing them.

In view of the foregoing, it would be advantageous to provide a method, system, and computer-readable storage device to manage message threads by detecting high-priority messages and allowing greater flexibility for the user to dictate which messages are to be highlighted and how they are to be highlighted.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and computer-readable storage device for managing message threads by highlighting high-priority messages. The process of identifying high-priority messages may be fully automated, driven by a user's manual feedback, or a combination of both. An example system can identify a usage pattern of a user or a group of users interacting with a message thread. Such a usage pattern can be, for example, related to how often the user accesses each message in the message thread.

Then, based on the usage pattern, the example system can analyze individual messages in the message thread to identify a high-priority message. The usage pattern can be based on more than one factor, and the analysis may take into account the various factors by assigning each factor a weight. Alternatively, or in combination with the usage pattern detection, the system can receive feedback from the user regarding which messages should be given higher priority. For example, the user may click a button, provide a rating, alter the position of the message to signal to the system which messages may be more important, relevant, or useful to her.

Once the example system identifies the high-priority message, the system then highlights the message when, for example, rendering the message thread on a display. A highlighted message is more likely to draw attention from the user because it is, in general, more visible, accentuated, etc. compared to other messages.

Optionally, the user may also switch to a non-prioritized viewing mode within the inbox user interface to switch off any highlights that may have been applied to the high-priority messages in the prioritized viewing mode. The next time the user turns the prioritized viewing mode back on, the highlights will be restored and the high-priority messages will once again be emphasized. Having such flexibility allows the user to take advantage of the priority-based organization while at the same time allowing the user to revert to a more traditional style of presentation whenever desired. The context for each of the viewing modes would not be lost after switching from one viewing mode to another.

A repository of high-priority messages may be also provided. Messages that pass a certain priority threshold can be culled from each individual inbox to a common repository where multiple users can share and view these messages. The example system can associate the high-priority messages with a repository and grant to the repository users access to the high-priority messages stored therein. The repository users may also contribute further knowledge to the repository by adding annotations such as comments, links, calendar events, etc. to the high-priority messages. The annotations in turn are shared by other repository users.

BRIEF DESCRIPTION OF THE DRAWINGS

FIG. 3 illustrates an exemplary inbox user interface with message threads;

FIG. 7 illustrates an example user interface for a repository of high-priority messages;

DETAILED DESCRIPTION

Various embodiments of the disclosure are described in detail below. While specific implementations are described, it should be understood that this is done for illustration purposes only. Other components and configurations may be used without parting from the spirit and scope of the disclosure.

The present disclosure addresses a need for better message thread management. A system, method and computer-readable device are disclosed which are directed to message inboxes and highlighting high-priority messages and message threads. A brief introductory description of a basic general-purpose system or computing device in FIG. 1 which can be employed to practice the concepts is disclosed herein. A more detailed description of message thread management will then follow.

These variations shall be described herein as the various embodiments are set forth. The disclosure now turns to FIG. 1.

Figure 1:
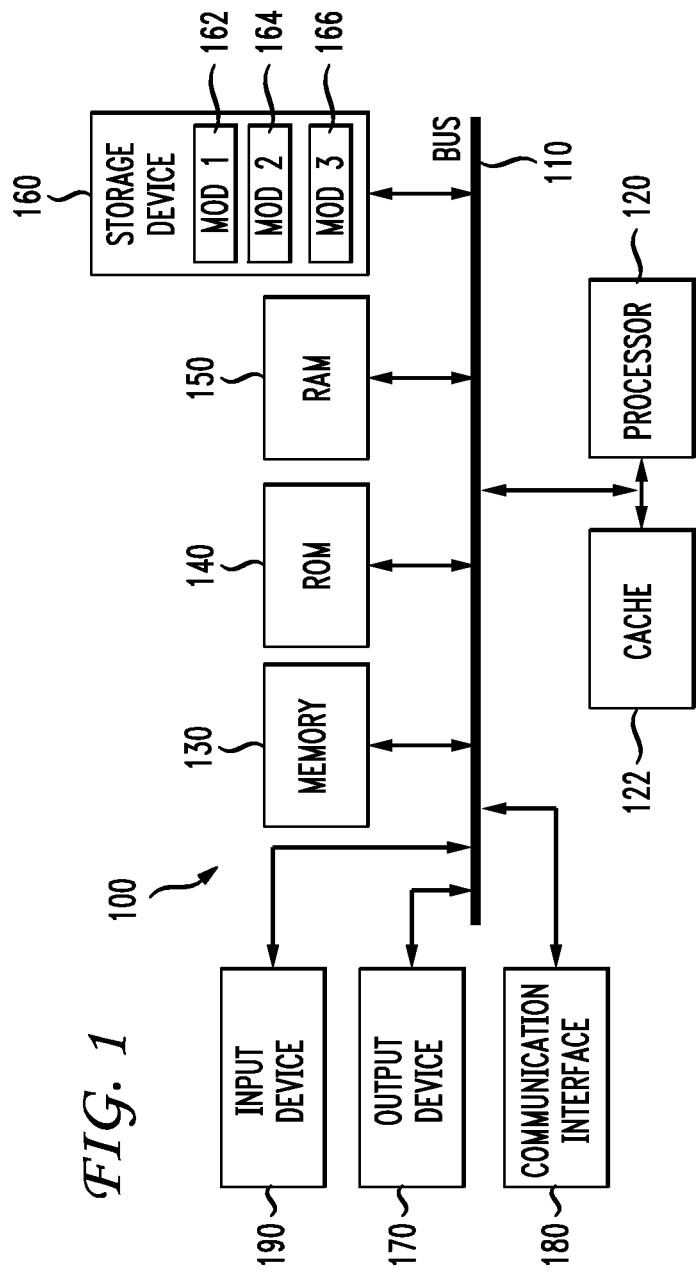
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high-speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer-readable storage media provide nonvolatile storage of computer-readable instructions, data structures, program modules and other data for the computing device 100. In one aspect, a hardware module that performs a particular function includes the software component stored in a tangible computer-readable storage medium in connection with the necessary hardware components, such as the processor 120, bus 110, display 170, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 100 is a small, handheld computing device, a desktop computer, or a computer server.

Although the exemplary embodiment described herein employs the hard disk 160, other types of computer-readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example, the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations.

Figure 2:
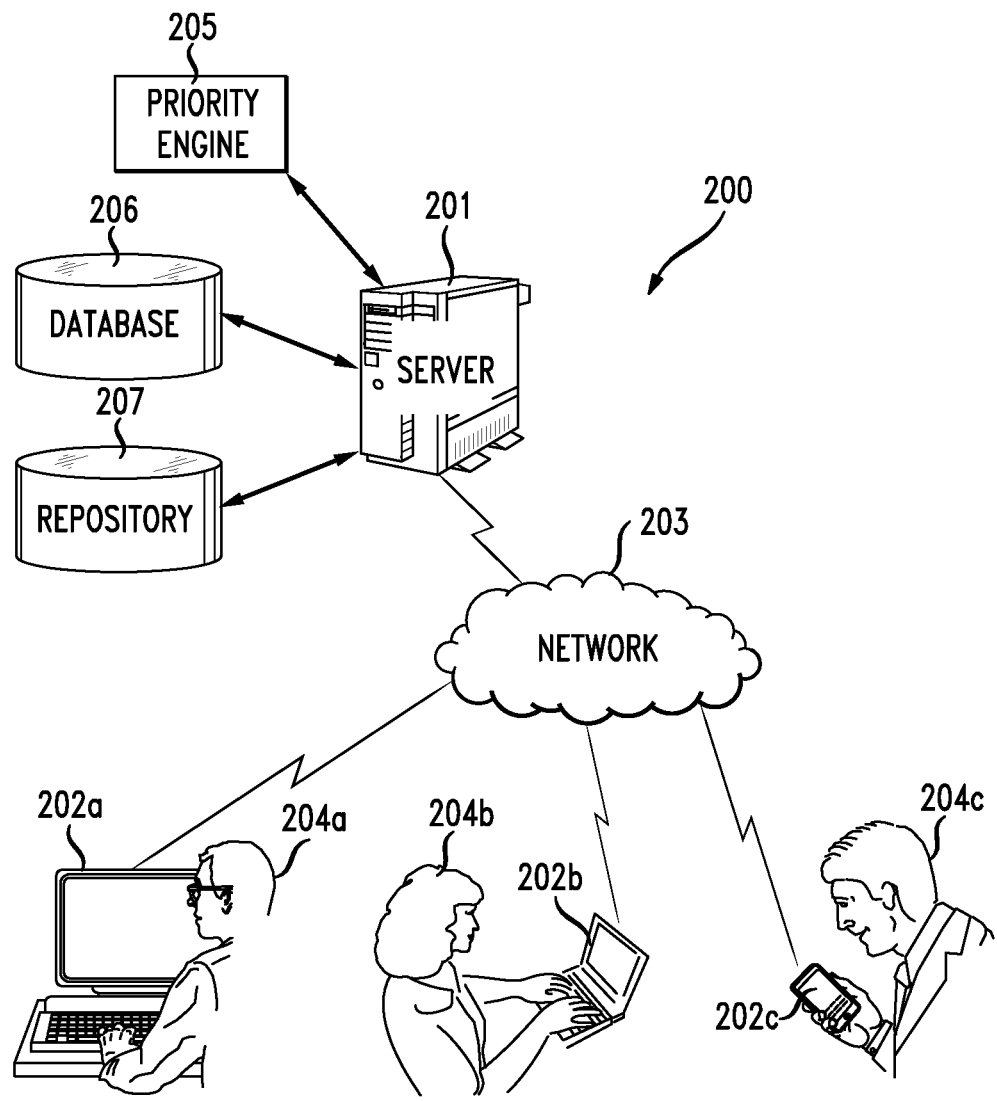
FIG. 2 illustrates an example messaging system.

Having disclosed some components of a computing system, the disclosure now turns to FIG. 2, which illustrates an example messaging system 200. Although throughout this application, the various embodiments are presented in terms of an email messaging system, the various embodiments are not limited in this regard. For example, the messaging system 200 can be based on text messaging, instant messaging, voice mail, video messaging, or any other means of communication that lends itself to organization via message threads. The messages may contain text, audio, video, data, or any other multimedia content. The server 201 provides messaging service to its client communication terminals 202a-202c through the network 203. In one embodiment, the server 201 is an email server that utilizes email protocols such as post office protocol (POP), simple mail transfer protocol (SMTP), Internet message access protocol (IMAP), etc. In another embodiment, the server 201 is a web-based email ("webmail") server. In yet another embodiment, the server 201 provides a text messaging service such as short message service (SMS) and multimedia messaging service (MMS). In still yet another embodiment, the server 201 provides an instant messaging service.

The communications terminals 202a-202c allow their users 204a-204c to send, receive, and access messages. The communications terminals 202a-202c can be any device that is capable of communicating with another device, sending, and receiving electronic messages. In one embodiment, the communications terminal is a desktop computer 202a. In other embodiments, the communications terminal is a laptop computer 202b or a smartphone 202c. In still other embodiments, the communications terminal is a tablet computer, a wearable computing device, a smart home appliance, or a vehicle telematics device. The communications terminals 202a-202c may provide a messaging service, such as email, text messaging, instant messaging, video messaging, etc., through various types of user interfaces. In one embodiment, the users 204a-204c utilize a keyboard and a mouse to interact with the communications terminals 202a-202c. In another embodiment, the users 204a-204c interact with the communications terminals 202a-202c through a touch screen. In yet other embodiments, the interaction is accomplished through voice commands or body gestures. The communications terminals 202a-202c are connected to the network 203 via either wired or wireless connections.

The network 203 can include a public network, such as the Internet, but can also include a private or quasi-private network, such as an intranet, a home network, a virtual private network (VPN), a shared collaboration network between separate entities, etc. Indeed, the principles set forth herein can be applied to many types of networks, such as local area networks (LANs), virtual LANs (VLANs), corporate networks, wide area networks, and virtually any other form of suitable wired or wireless network. Each of the user terminals 202a-202c can be implemented in a localized or distributed fashion over the network 203.

The server 201 can communicate with other components such as the priority engine 205, the database 206, and the repository 207, although one or more of these components may be optional. These components 205-207 and the server 201 can be separate or together. That is, the server 201, the priority engine 205, the database 206, and the repository 207 can be physically separate devices or two or more of them can reside in the same system as components of the system.

The priority engine 205 is a piece of software, a piece of hardware, or a combination of both that determines which message thread(s) or which individual message(s) in a given message thread should be given higher priority. As used herein, the term "high priority" can be synonymous with relevance, importance, value, usefulness, helpfulness, or preference. For example, the priority engine 205 may decide which messages in a particular message thread would be more important for a user or a group of users. Then, these decisions can be used to highlight some of those messages.

The database 206 can store the actual messaging data such as messages, message threads, inboxes, attachments, metadata, address books, etc. In another aspect, the database 206 can store business intelligence that can be used to prioritize messages and message threads. For example, the database 206 may contain information about what is considered an important piece of data within a given enterprise environment. More specifically, example business intelligence stored in the database 206 may dictate that messages regarding quality assurance guidelines are very important.

Some messages may be highly relevant and useful not only to their originally intended recipients, but also to other members of the organization. In one aspect, the repository 207 stores therein a collection of messages culled from various message inboxes belonging to the users 204a-204c. These can be messages that are marked as high priority by the users 204a-204c, the communications terminals 202a-202c, the server 201, or the messaging system 200. In one embodiment, the repository 207 can store these messages and allow its users to access the messages in a convenient and efficient manner. For example, in an enterprise setting, members of a project group can each mark some of the messages in their respective email inboxes that they think might be relevant and/or helpful to other members of the group. Other messages can be automatically selected by the system 200 based on the users' usage patterns. The repository 207 would then manage a list of these messages. The authorized members of the group can simply access the repository 207 to discover and access important messages, regardless of whether the messages were originally intended for them or not.

FIG. 3 illustrates an exemplary inbox user interface 300 with message threads 304a-304d. The message inbox in this particular example belongs to a service agent named Daniel Day. Although the inbox user interface 300 is shown as resembling a desktop application in FIG. 5, a person skilled in the art will recognize that many other forms of message inboxes may be used, such as a mobile app, a web browser application, an audio-only application (such as on a vehicle telematics system or a wearable computing device), a head-mounted display application, etc.

The optional viewing mode toggle user interface (UI) element 301 allows the user to switch between the "prioritized" viewing mode 302a and the "non-prioritized" viewing mode 302b. The prioritized viewing mode 302a allows the user to view the inbox 300 with some of the high-priority messages 305a-305k and/or message threads 304a-304d highlighted. When in the non-prioritized viewing mode 302b, all the highlights are removed and the inbox 300 is displayed according to a conventional sorting method, such as by sender, by recipient, by subject, by received date, by size, by attachment, etc., in ascending or descending order. The user can change the sorting method by which the messages 305a-305k are displayed, for example, by interacting with the headers of the message thread list view 303. The non-prioritized viewing mode 203b, in general, does not allow the user or the system 300 to fine-tune the presentation of the messages 305a-305k or the message threads 304a-304d, beyond the traditional sorting methods.

The example message thread list view 303 displays various messages 305a-305k and message threads 304a-304d that the user has received in the past. As used herein, the term "message" refers to a communication, which consists of text, pictures, audio, video, or other data, that is sent from one user to another user and delivered via a network. The term "message thread" is a collection of such messages that are logically related to each other, usually displayed as a group. For example, one such message thread may include every message and its reply/forward messages among two or more users under the same topic of discussion over the course of a few days. Another example message thread may contain every message pertaining to the same general topic regardless of the message's sender or recipient. The user may interact with the messages 305a-305k or the message threads 304a-304d to view more information. For example, the user may click on one of the messages 305a-305k to see the body of the message as well as other metadata. In one embodiment, individual messages 305f-305k belonging to a message thread 304d are displayed literally in a thread-like configuration, where related messages are visually grouped together to form a "thread." In one aspect, a thread 304d can be displayed in a hierarchical configuration, where the relationships among the constituent messages 305f-305k can be visually represented through indentation, hierarchization, etc. In another aspect, a thread 304c can be "collapsed," so that part of the thread can be hidden from the view to remove clutter and/or save space. While in such a collapsed view, only one representative message 305e (or few representative messages) belonging to the collapsed thread 304c may be visible to the user until the user expands the thread.

Figure 4:
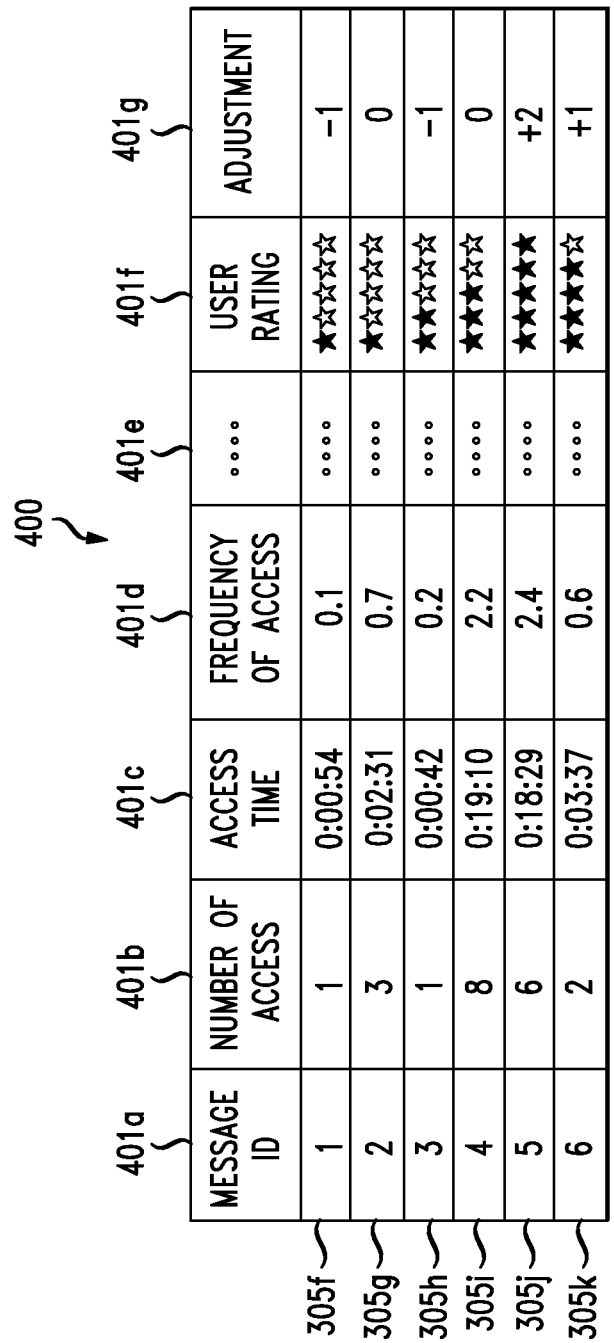
FIG. 4 illustrates exemplary criteria for prioritizing messages in a message thread.

FIG. 4 illustrates exemplary criteria 400 for prioritizing messages in the example message thread 304d. The example messages 305f-305k belonging to the message thread 304d may have message identification numbers 401a associated with them. The priority engine 205 may use various metrics 401b-401g to determine the priority of each of the messages 305f-305k. The system 200 can keep track of those metrics 401b-401g over time to make decisions as to which message has higher priority over the others.

In one embodiment, the priority engine 205 uses the number of times that a message has been accessed 401b by one or more users as a metric to determine priority. This is based on the general observation that the more often a given message is accessed by users, the more valuable the message tends to be to those and other users. In other words, messages that have already been accessed tend to have a higher chance of repeat access in the future. For example, if several communications went back and forth between a real estate agent and her client, and there was one message—an email message containing an HUD-1 settlement statement—that both the agent and the client went back to re-open more often than any other messages in the message thread, then the priority engine 205 may determine that it should grant higher priority to that particular message. In one variation, the system 200 keeps track of the number of access by one user (e.g., sender or recipient). In other variations, the number of access by multiple users (e.g., multiple recipients, CC/BCC recipients, forwarded users) can be collected. Each user may be given a weight, and the final access score can be calculated based on such weights. For example, the number of access by the intended message recipient can be given more weight than the number of access by a user to whom the message was merely CC'd. In another example, more weight may be assigned to a supervisor than to her subordinates.

In another embodiment, the priority engine 205 uses the accumulative or average access time 401c of each message 305f-305k as a metric for determining priority. In general, the more time a user spends accessing a message, the more relevant the message tends to be to the user. FIG. 4 depicts the accumulative access times 401c for each of the messages 305f-305k. The average time spent per access (not depicted) can also be used as a factor to determine priority. The cumulative or average access time for a message can be further adjusted by the size of the message. For instance, even if a user spent about the same amount of time reading two different messages, if one of the messages was twice as long as the other, the priority engine 205 may accord higher priority to the shorter message, because the user, in fact, spent twice as much time (and possibly twice as much care) reading that message per word.

In yet another embodiment, the priority engine 205 uses the frequency of access 401d for each of the message 305f-305k as a metric for determining priority. As used herein, the term "frequency of access" refers to the number of times that a user or a group of users accesses a message during a particular period. In one embodiment, the frequency is measured by observing how many times a given message is accessed in a given day, week, month, etc. In another embodiment, the frequency means how many times, on average, a given message is accessed when the message thread to which the message belongs is accessed. For example, a user accesses message thread A 50 times and among those 50 times, she accessed message B in the message thread A 25 times. On the other hand, the user accesses message thread C 10 times and every single time she accessed message thread C, she also opened message D belonging to the message thread C (i.e., 10 times). In this example, message D (100%) would have higher frequency of access than message B (50%).

A person skilled in the relevant art will recognize that many other metrics 401e than what is shown in FIG. 4 may be used to determine message/message thread priority. In one aspect, the metrics are based on a usage pattern of one or more users. In another aspect, the metrics are based on other factors such as the content of the messages. For example, (1) whether the message was replied to and how many times it was replied to, (2) the amount of time the sender spent drafting the message, (3) the amount of time the sender/recipient spent replying to the message, (4) the length of the message, (5) how many times the other people on the same thread have viewed the message, (6) how many times the message was quoted and what the proportion of the quoted text was, (7) who the sender/recipient is and what the relationship between the sender and the recipient is, (8) the existence/size/type of an attachment, (9) formatting of the message as it was originally composed (e.g., questions in bold, red), etc. can all be factors. Moreover, the determination can also be based on the contents of the message. For example, the system 200 can automatically detect frivolous or relatively inconsequential messages such as a mere acknowledgement (e.g., "Okay."), a short statement or query that is included in the subsequent response as a quote (e.g., "Any recommendations for the new slogan?"), and a message that was accidentally sent without an attachment only to be resent the second time with a substantially similar message and the correct attachment. These messages can be given low priority and/or hidden from the view to direct the user's attention to more relevant messages.

The message priority can be determined, in part or in whole, by user input 401f. Users 202a-202c can provide direct or indirect feedback as to how the messages 305f-305k may be prioritized. FIG. 4 depicts exemplary user ratings 203b that the users 202a-202c can assign to each message 305f-305k. A higher star rating, for example, can drive a particular message towards more visibility within the message thread 304d. Depending on rules and policies of the system 200, in one aspect, messages with user ratings lower than a threshold value can be automatically hidden from the view. In another aspect, messages with user ratings higher than a threshold value can be automatically highlighted. In yet another aspect, the user ratings can be given a weight and used as one of multiple factors that determine message priority. Although the user input 401f is shown as star ratings in FIG. 4, the various embodiments are not limited in this regard. For example, the user feedback can be collected in the form of a switch, a toggle, a star button, a "like" button, a thumb up/down button, a "hide" button, a "move" button, a numeric rating, a slider, designation as a "favorite" message, designation as a "read later" message, etc. In one embodiment, the user can drag and drop the messages 305f-305k via a graphical user interface (GUI) to directly influence the relative position in which the message appears in the message thread 304d. For example, if the user deems that the fifth message 305j should appear at the top of the message thread 304d, he can simply drag the message with a mouse pointer to the top of the thread 304d on the user interface. Such user feedback can override other factors 401a-401e and become the sole factor in determining priority, or the feedback can merely complement the other factors 401a-401e.

In one variation, the system 200 can take into account various adjustment scores 401g when finalizing message priority. For example, the system 200 may utilize business intelligence to further fine-tune the priority scores. As used herein, business intelligence is a set of rules, policies, theories, methodologies, processes, architectures, technologies, etc. that can transform data into meaningful and useful information for business purposes. A business can be any organization whether it be commercial or noncommercial. An enterprise that is deploying the system 200, for instance, can infuse any knowledge that the members of the enterprise have accumulated into the priority engine 205. For example, the email system in a customer service center may accord higher priority to messages sent by repeat loyal customers. In another example, where the correspondence is between quality assurance engineers, a message containing a binary log file may be deemed very important. In yet another example, an email message containing the customer's payment information may be given a high priority.

In one aspect, for troubleshooting engineers, the emails in a thread with a customer can grow large and unmanageable over time. Prioritizing such emails can be based on any criteria that the engineers may already be using in an application. In addition, any knowledge and policy related to business may dictate that the priorities be changed based on subsequent messages and/or the problem currently being addressed. The priorities may also change based on a reply from a customer. As the message thread grows larger, the priorities may constantly shift and rearrange. For instance, an email that states and describes the problem may initially be accorded the highest priority, only to be bumped down in priority by another subsequent email that reads, "It is my understanding that your problem is . . . ." Similarly, a message containing the term "hung server" or "network failure," may be given the highest priority, until the user receives a follow-up message containing the term "time of failure" or the phrase, "the root cause of the failure." Business intelligence may also dictate that, for instance, a configuration/setup, an identification of a problem or a solution, a version number of a product, etc. are all indicators of an important message.

In one aspect, the various factors 401b-401g are quantified and then multiplied by weight values to arrive at a final priority score. For example, the priority engine 205 may be configured to assign a higher weight to the user input 401f than any other factors so that the feedback from the user would be used as the most dominant factor. In one variation, the weights are dynamic rather than fixed. In this variation, the system 200 can dynamically adjust the distribution of weights that are assigned to each of the metrics 401a-401g, possibly based on user feedback, so that the priority determination can become more accurate and/or personalized over time.

Figure 5:
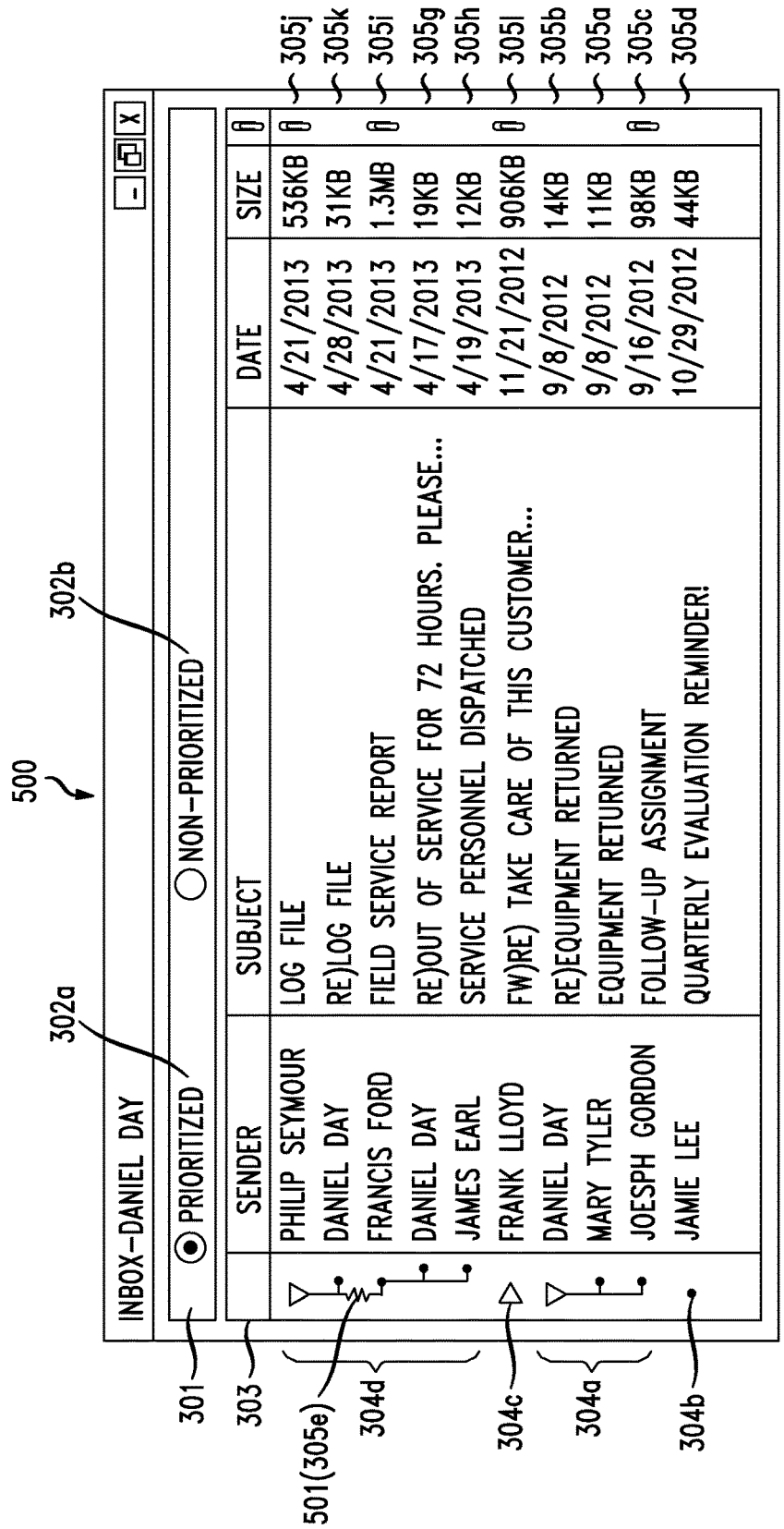
FIG. 5 illustrates an exemplary inbox with highlighted messages in message threads.

FIG. 5 illustrates an exemplary inbox 500 with highlighted messages in message threads. As used herein, to "highlight" generally means to direct attention to an object by making that object relatively more visible, emphasized, accentuated, etc. or making other objects relatively less visible, hidden, deemphasized, etc. Some of the exemplary ways to highlight a message or a message thread may include (1) changing the font, size, color, style, attribute, etc. of the title and/or the body of the message/message thread (e.g., underlined, italicized, bold, indented, blinking, moving, etc.), (2) changing the position of the message/message thread (e.g., higher up in the message thread may be mean more visibility), (3) designating the message as one of the representative messages in a collapsed message thread view, (4) hiding, deemphasizing, or de-highlighting some or all of the other messages/message threads.

In FIG. 5, the optional viewing mode toggle UI element 301 is depicted as being set to the "prioritized" viewing mode 302a. The prioritized viewing mode 302a allows the user to view the inbox 500 with some of the high-priority messages 305a-305k and/or message threads 304a-304d highlighted. In one embodiment, the display attributes and ordering of the messages and message threads for the prioritized mode 302a and the non-prioritized mode 302b are kept separate from each other. In such embodiment, changing a display attribute or order in one mode would not affect the display attribute or order in another mode, and the user can switch back and forth between the two modes at her convenience. For example, a text message app user Cindy usually keeps her text messages in chronological order in the non-prioritized mode 302b. However, she wants to rearrange the order in which some of the messages appear in one of the message threads. She re-sorts the messages in reverse-chronological order to briefly examine a few recently received messages, and then she switches the view to the prioritized viewing mode 302a by using the toggle UI element 301. The messages and message threads are now presented to her the way she left off the last time she accessed the prioritized viewing mode 302a. Cindy makes additional adjustments to the presentation by dragging and dropping a couple of messages to alter their positions, and hiding a message that she deems unimportant to her. When she switches back to the non-prioritized viewing mode 302b, the messages are presented in reverse-chronological order, which is the last sorting method she was using before she switched over to the prioritized viewing mode 302a. In another embodiment, the non-prioritized viewing mode 302b does not exist and the messages 305a-305k are always presented in the prioritized viewing mode 302a. In such an embodiment, there is no need for the toggle UI element 301. In yet another embodiment, some of the high-priority messages are displayed, possibly in a separate area from the main message thread list view 303, even when the inbox UI 500 is in the non-prioritized viewing mode 302b, so that the user would have easy access to some of the high-priority messages. In such an embodiment, interacting with one of the high-priority messages can switch the inbox UI 500 back into the prioritized viewing mode 302a.

In one embodiment, the prioritized viewing mode 302a presents some of the high-priority messages as being highlighted. In FIG. 5, for instance, the messages 305g-305k belonging to the message thread 304d appear in a different order in the prioritized viewing mode 302a than they did in the non-prioritized mode 302b in FIG. 3. In this example, some of the messages 305j, 305i are highlighted by being pushed up in position within the message thread 304d. Consequently, the message 305h, which the priority engine 205 evidently determined to be relatively unimportant, is pushed to the bottom of the thread 304d. The message 305f of FIG. 3 is nowhere to be seen in FIG. 5, because it is hidden from the view as indicated by a hidden message indicium 501. The optional hidden message indicium 501 notifies the user that one or more messages/message threads are currently hidden from the view and functions as a placeholder for such hidden messages/message threads to indicate their original positions. In one aspect, a user can "unhide" the hidden messages or message threads by interacting with the hidden message indicium 501 (e.g., clicking on it).

The message thread 304c is presented in a "collapsed" view, which is to say that only a few messages (one message in this case) of the thread are visible until the user "expands" the thread. In this exemplary prioritized viewing mode 302a presentation, the message 305e of FIG. 3 is now replaced, in FIG. 5, with another message 305l belonging to the same message thread 304c for the collapsed view of the thread 304c, as a result of the priority engine 205's priority determination. Once the user expands the message thread 304c by, for example, interacting with a UI element of the GUI, other messages hitherto hidden, including the message 305e, may be again shown to the user.

In this exemplary inbox 500 with the prioritized viewing mode 302a, the vertical positions of the message threads 304a-304d are also rearranged to reflect their message thread priority according to what is determined by the priority engine 205. For example, the system 200 has now placed the message thread 304d at the top, while pushing the message thread 304b to the bottom. Those skilled in the art, however, would appreciate that there are other ways to highlight important message threads, such as changing one or more display attributes of the message threads 304a-304d. Although many aspects of usage pattern detection, priority determination, and highlighting are discussed herein in terms of messages, those skilled in the art will appreciate that those same principles can be applied to message threads just as well.

While in the prioritized viewing mode 302a, the user may interact with the GUI to manually adjust or influence the way the system 200 presents the messages 305a-305l and/or the message threads 304a-304d. In one embodiment, the user may provide priority feedback in the form of a switch, a toggle, a star button, a "like" button, a thumb up/down button, a "hide" button, a "move" button, a promote/demote button, a "favorite" button, a "read later" button, a numeric rating, or a slider. If the inbox user interface 500 is based on audio only, the user feedback may be provided in a suitable audio form, for instance, via speech recognition. In another embodiment, the user may drag and drop the messages 305a-305l via the GUI to manipulate their positions. In yet another embodiment, the user can set rules to assign priority or determine positions of the messages 306a-306l. For example, the user may set up a rule which says, "A message sent by Steven Choe (supervisor) receives priority over any other messages, on Mondays and Fridays," "A message that only contains a mere acknowledgement ("Okay," "Will do," etc.) in the body of the message is always hidden," or, "A message with an attachment with the .BIN extension receives a +7 adjustment in the priority score."

Figure 6:
FIG. 6 illustrates an example message view with highlighted messages.

FIG. 6 illustrates an exemplary message view 600 with highlighted messages 601a-601d, which, in this non-limiting example, correspond to the messages 305j, 305k, 305e, and 305i of FIG. 5, respectively. In one embodiment, the message view 600 is an alternative viewing mode of the inbox user interface 500 of FIG. 5. In such viewing mode, the user may view more detailed information about the messages 601a-601d, including the message body text. Although the exemplary message view 600 is shown in the prioritized viewing mode 302a, it can be viewed, in one embodiment, in an alternative non-prioritized viewing mode 302b using an optional viewing mode toggle UI element 301 similar to the one shown in FIG. 3. In such an embodiment, the user may freely switch between the two viewing modes, and the system 200 can retain the priority information regarding highlighted messages even when the message view 600 is in the non-prioritized viewing mode 302b so that the next time the user switches back to the prioritized viewing mode 302a the messages will be highlighted in the same manner.

The message view 600 shows some example ways that some of the messages 601a-601d can be highlighted. For example, instead of the usual chronological or reverse-chronological order, the messages 601a-601d are reordered to reflect their priorities as determined by the priority engine 205. Thus, in this example, the system 200 displays the message 601b, which is dated Apr. 28, 2013, between the two messages 601a-601d that are dated Apr. 21, 2013. One message 601c is hidden from the view because the priority engine 205 evidently determined that the message 601c is less important. The optional hidden message indicium 601c takes the place of a message or a group of messages that the indicium 601c is replacing to indicate to the user that some messages are hidden from the view. Although the indicium 601c is shown in FIG. 6 as a skeuomorphic representation of a crinkled-up paper with accordion-like folds, any other suitable, and preferably unobtrusive, representation of a hidden message may suffice, such as a dog-eared corner, grayed out typeface, transparent/translucent typeface, collapsed or layered paper, etc. In one aspect, interacting with the indicium unhides any hidden messages.

In one variation, the message view 600 may provide the user with feedback UI elements 602a-d, 603a-d, 604a-d so that the user can influence or directly manipulate the priority engine 205's decision-making process. For example, the user may give each message 601a-601d a star rating 602a-d to indicate which messages are more important to her than others. In another example, the user can interact (e.g., drag and drop via a touchscreen) with the move buttons 603a-d to rearrange or indent the messages 601a-601d in order to make some of them more visible and/or accessible. In yet another example, interacting (e.g., clicking with a mouse) with the hide buttons 604a-d can make the messages 601a-d invisible or less prominent.

FIG. 7 illustrates an example user interface 700 for a repository 207 of high-priority messages 702a-702i. A repository, as used herein, is a physical or logical storage space where select high-priority messages from one or more message inboxes are culled into one place for easy access for one or more users. The repository users may or may not be the same as the inbox users. For example, in an enterprise setting, a team working on a group project may set up a repository in order for the members of the group to easily share important messages that the individual members have sent or received. More specifically, the project leader who received an important message from a client regarding the direction of the project may want to share the message with everyone else in her team. Instead of forwarding the message to everyone in the group, she can simply place a copy of the message or a link to the message in the repository. Anyone in the team who has access to the repository can open the message and, if he so desires, add annotations such as comments 701f, tags 701e, calendar events, attachments, links, etc. to augment the sharing experience. In another example, agents in a call center can share some of the customer service correspondence that they think might be helpful to the other agents may share such messages via a message repository 207. In particular, one agent may have discovered, while assisting a customer, a product defect that has never been encountered before, and he would like to share the relevant knowledge—symptoms, data, solutions, best way to help the customer, etc.—with the other agents in the call center. He can simply mark the entire message thread as highly important, and the message thread would then be shared via the repository 207 with the other agents. The other agents can add their own comments 701f or messages to the thread. In one aspect, the repository 207 is used as a group training tool. In another aspect, the repository 207 is used as a knowledgebase. In yet another aspect, the repository 207 is a monitoring tool.

In one embodiment, the repository 207 collects high-priority messages, from one or more inboxes, that satisfy a threshold condition. For example, the repository 207 can only collect messages whose priority scores are in the top 15%. In another embodiment, the repository 207 collects messages that the users have explicitly designated as being shared on the repository 207. The users can mark relevant messages by, for instance, clicking on a "share" button on a message. In one aspect, the repository 207 creates duplicate copies of the collected messages and store those copies. In another aspect, the repository 207 simply store references to the high-priority messages stored in a separate database or otherwise store logical links to those messages without storing copies of data.

Although FIG. 7 shows one embodiment of the user interface 700 for the repository 207, those skilled in the art will recognize that there can be many other embodiments. For example, the repository 207 can be a database that other applications can access. In one embodiment, a user can click on one of the messages 702a-702i to examine the message in more detail. Through the user interface 700, users can also add additional information to the messages 702a-702i, such as categories 701d, tags 701e, notes 701f, comments, annotations, calendar events, attachments, links, etc. The added information can be made available to other users of the repository 207. In one aspect, the category 701d is automatically assigned based on the content of the message or a set of predetermined rules. In another aspect, the category 701d is assigned by a user, whether it be the original recipient of the message or someone else. The messages 702a-702i may be associated with one or more tags, which facilitate better organization and easier content searching.

Having disclosed some basic system components and concepts, the disclosure now turns to the exemplary method embodiments shown in FIGS. 8-11. For the sake of clarity, the methods are described in terms of an exemplary system 100 as shown in FIG. 1 configured to practice the method. Additionally, one or more network nodes shown in the system 200 of FIG. 2, including the server 201, the communications terminals 202a-202c, the priority engine 205, the database 206, and the repository 207, can also perform any of the steps disclosed herein. The steps outlined herein are exemplary and can be implemented in any combination thereof, including combinations that exclude, add, or modify certain steps.

Figure 8:
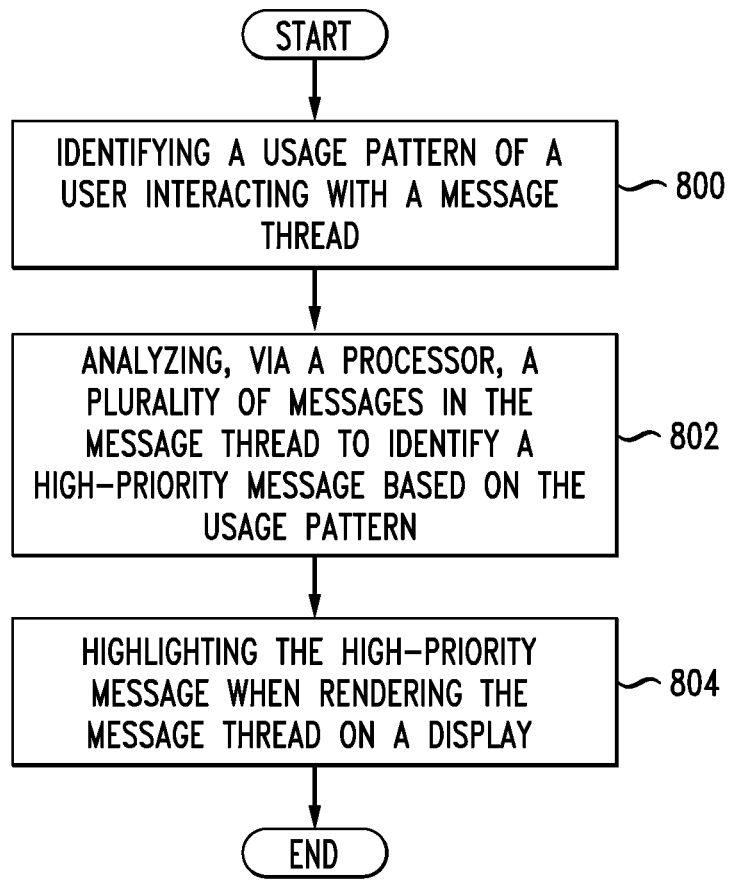
FIG. 8 illustrates an example method embodiment for highlighting a high-priority message.

FIG. 8 illustrates an example method embodiment for highlighting a high-priority message. The system 100 identifies a usage pattern of a user interacting with a message thread (800). The usage pattern can be based on one user or a group of users. Some of the examples of a usage pattern may include, (1) the number of access to each of the messages, (2) the frequency of access to each of the messages, (3) the amount of time (cumulative and/or average) spent on accessing each of the messages, (4) whether the message was replied to and how many times it was replied to, (5) the amount of time the sender spent drafting the message, (6) the amount of time the sender/recipient spent replying to the message, (7) the length of the message, (8) how many times the other people on the same thread have viewed the message, (9) how many times the message was quoted and what the proportion of the quoted text was, (10) who the sender/recipient is and what the relationship between the sender and the recipient is, (11) the existence/size/type of an attachment, etc.

The system 100 then analyzes, via the processor 120, a plurality of messages in the message thread to identify a high-priority message based on the usage pattern (802). In one embodiment, the analysis is run on a priority engine 205, which may or may not be part of the server 201. A high-priority message can be any message that is relevant, important, valuable, useful, or helpful to one or more users or preferred by one or more users. Various factors, including the usage pattern, may be used to determine message priority and thereby identify the high-priority message. Each factor can be weighted to derive an overall priority score for each message. In one aspect, a threshold value is used to identify the high-priority message. The high-priority message can be an email message, a text message, an instant messenger message, or any other type of message that can be managed with message threads. In one variation, analyzing the plurality of messages is further based on business intelligence. In another variation, the system 100 identifies a group usage pattern of a plurality of users interacting with the message thread, and analyzes the plurality of messages further based on the group usage pattern.

The system 100 highlights the high-priority message when rendering the message thread on a display (804). Highlighting the message can be accomplished by (1) changing a position of the high-priority message within the message thread relative to other messages in the plurality of messages, (2) modifying a display attribute (e.g., font, size, color, style, indentation, etc.) of a non-high-priority message in the plurality of messages when rendering the message thread on the display, (3) presenting the high-priority message in a collapsed view of the message thread, and/or (4) hiding, deemphasizing, or de-highlighting some or all of the other messages. Alternatively, if the system 100 employs an audio-only application, the high-priority message may be highlighted in an audible fashion instead of visually on a display. In one embodiment, the user can dictate to the system 100 how the high-priority messages are to be highlighted. For example, the system 100 may provide the user with several options (e.g., promoting to the top, indenting, presenting in red, etc.) to choose from, and the user can choose an appropriate highlighting method.

Figure 9:
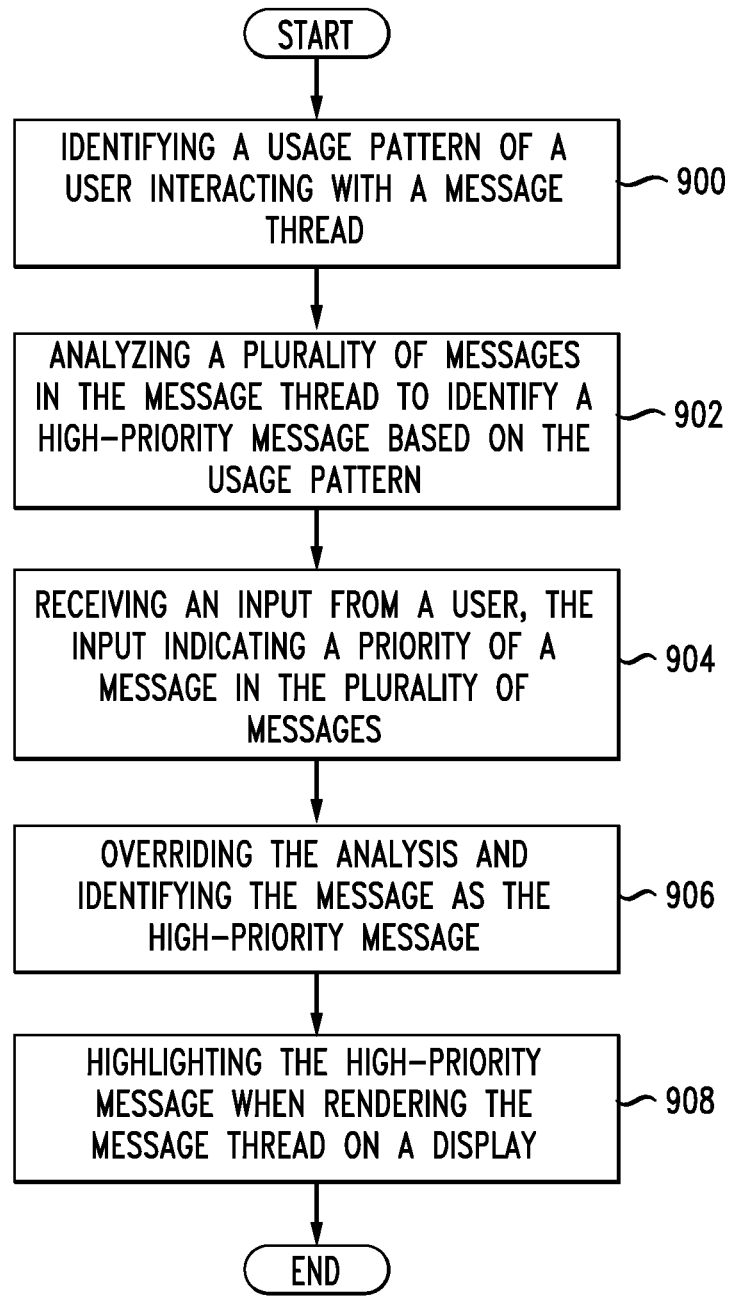
FIG. 9 illustrates an example method embodiment for highlighting a high-priority message based on user input.

FIG. 9 illustrates an example method embodiment for highlighting a high-priority message based on user input. The system 100 identifies a usage pattern of a user interacting with a message thread (900). The system 100 analyzes a plurality of messages in the message thread to identify a high-priority message based on the usage pattern (902). The system 100 receives input from a user, the input indicating a priority of a message in the plurality of messages (904). The system 100 may receive the input from the user via a switch, a toggle, a button, a rating, a slider, a drag-and-drop command, etc. Each of these input methods may indicate the user's intention to give the message a higher priority or a lower priority. In one variation, indicating the priority of the message is accomplished by indicating the priorities of other messages. For example, by hiding one message, a user may indicate that a higher priority must be accorded to another message. The system 100 overrides the analysis and identifying the message as the high-priority message (906). In another variation, the system 100 does not completely override the analysis, but instead uses the input from the user as one of the factors in the analysis to identify the high-priority message. For example, in such a variation, the user's five-star rating does not necessarily make the message a high-priority message, but merely is taken into account when weighing other factors. Once the high-priority message is identified, the system 100 highlights the high-priority message when rendering the message thread on a display (908).

Figure 10:
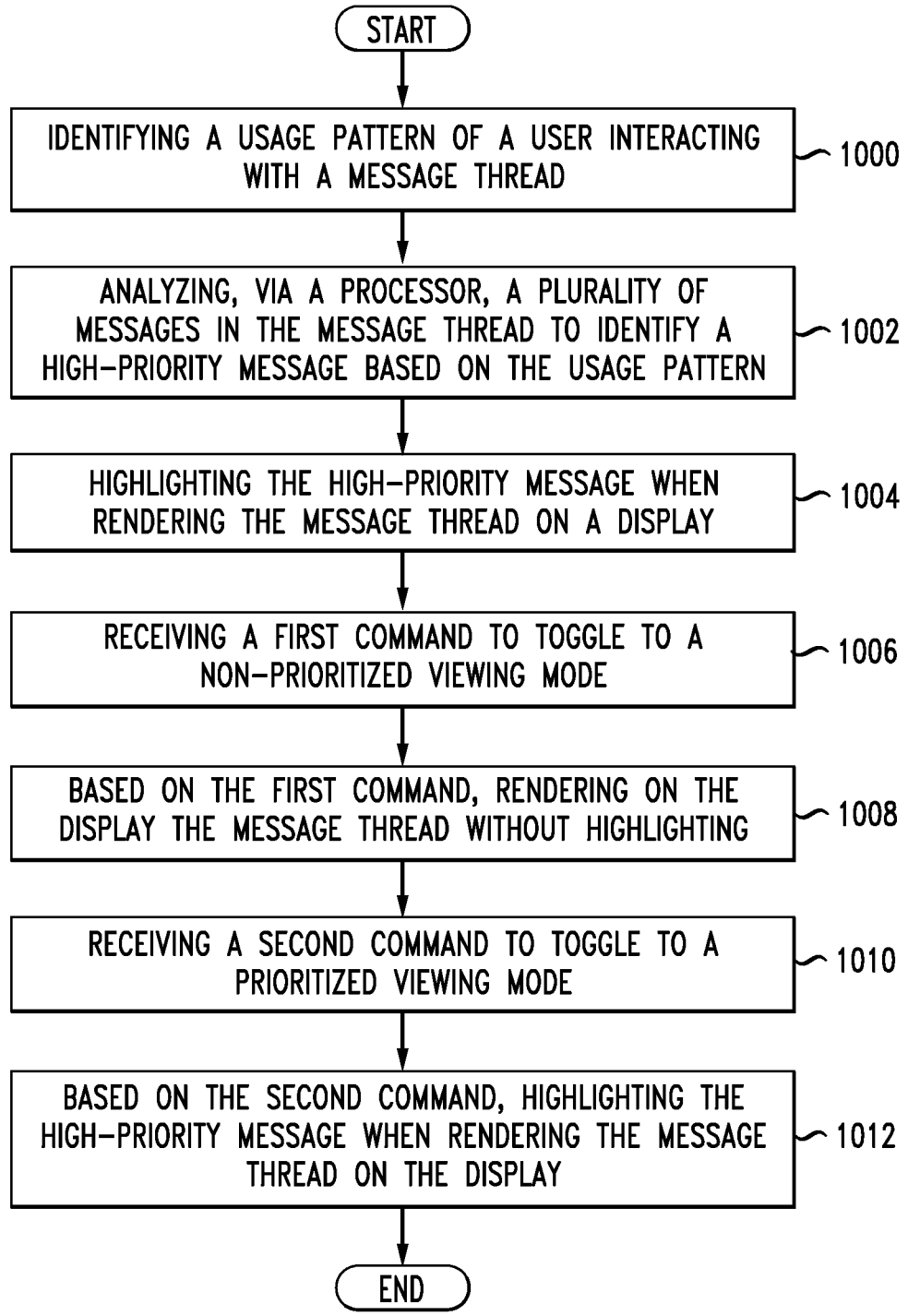
FIG. 10 illustrates an example method embodiment for switching between a prioritized viewing mode and a non-prioritized viewing mode.

FIG. 10 illustrates an example method embodiment for switching between a prioritized viewing mode 302a and a non-prioritized viewing mode 302b. The system 100 identifies a usage pattern of a user interacting with a message thread (1000). The system 100 analyzes a plurality of messages in the message thread to identify a high-priority message based on the usage pattern (1002). Next, the system 100 highlights the high-priority message when rendering the message thread on a display (1004). In one embodiment, the high-priority message is highlighted in a prioritized viewing mode 302a. The system 100 receives a first command to toggle to a non-prioritized viewing mode (1006). In one embodiment, the user may issue the command via a toggle UI element 301. For example, the UI element 301 can be a slider, a radio button, a rocker switch, a dropdown menu, etc. In another embodiment, the system 100 detects a trigger event and automatically switches to the non-prioritized viewing mode 302a. For example, the trigger event can be the user interacting with a column header to sort the messages chronologically, etc. In yet another embodiment, the first command is a speech command or a gesture-based command. Based on the first command, the system 100 renders on the display the message thread without highlighting (1008). In one embodiment, the system 100 does this in the non-prioritized viewing mode 302b. In the non-prioritized viewing mode 302b, all the highlighting activities for the high-priority messages are undone and the messages 305a-305k are presented according to a conventional sorting method such as chronological, reverse-chronological, or alphabetical sorting.

The system 100 may receive, at any time, a second command to toggle to a prioritized viewing mode (1010). Although the command to toggle to the non-prioritized viewing mode 302b and the command to toggle to the prioritized viewing mode 302a are termed as the first command and the second command, they need not be received in that order or any particular order. For example, the system 100 can receive the command to toggle to a prioritized viewing mode 302a first, and then receive the command to toggle to a non-prioritized viewing mode 302b. In one aspect, the second command may also be issued by the user via the toggle UI element 301. In another aspect, the switch to the prioritized viewing mode 302a can be automatically triggered by an event, such as the user interacting with a high-priority message in the non-prioritized viewing mode 302b, the user attempting to rearrange the order in which the messages are displayed, etc. In yet another aspect, the command is a speech command or a gesture. Based on the second command, the system 100 highlights the high-priority message when rendering the message thread on the display (1012). In one embodiment, the highlights are preserved and the high-priority message is highlighted in the same manner as before the system 100 switched over to the non-prioritized viewing mode 302b. The user can alternate between the prioritized viewing mode 302a and the non-prioritized viewing mode 302b at any time.

Figure 11:
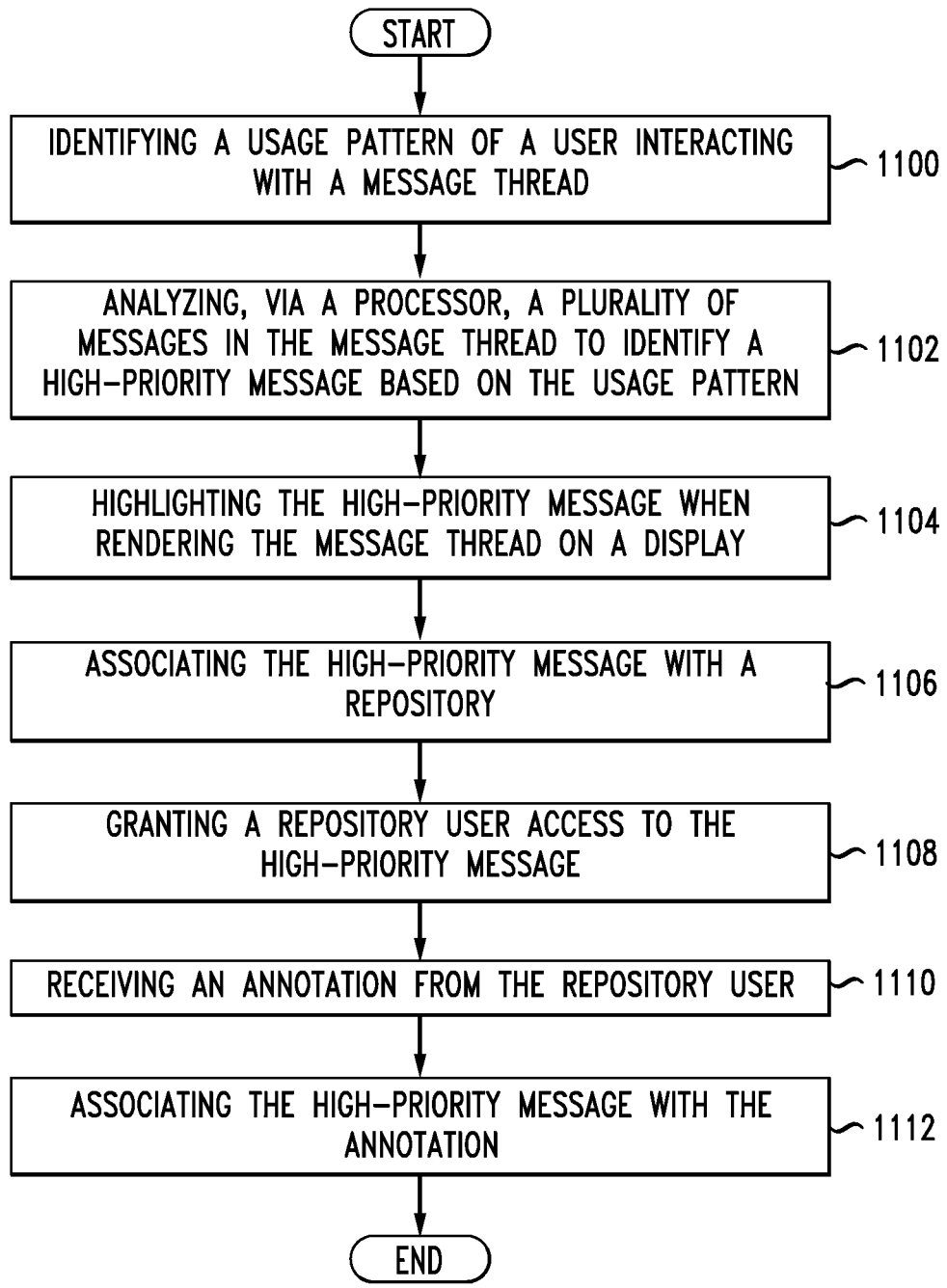
FIG. 11 illustrates still yet another example method embodiment.

FIG. 11 illustrates an example method embodiment for associating a high-priority message with a repository 207. In one embodiment, the repository 207 is a shared storage space where high-priority messages originating from multiple users may be shared. The repository 207 in that regard may be used as a knowledgebase, a new employee training tool, a best-practice showcase, etc. The system 100 identifies a usage pattern of a user interacting with a message thread (1100). The system 100 analyzes a plurality of messages in the message thread to identify a high-priority message based on the usage pattern (1102). Next, the system 100 highlights the high-priority message when rendering the message thread on a display (1104). The system 100 can associate the high-priority message with a repository (1106). In one embodiment, the association is performed by creating a duplicate copy of the high-priority message in the repository 207. In another embodiment, the association is performed by creating a logical connection between the high-priority message and the repository 207, for example, by means of a link, a reference, an address, etc. The repository 207 may provide its own user interface, such as a graphical user interface, an audio user interface, a gesture-based user interface, etc., so that its users can access it with ease. In one variation, the repository 207 is integrated with the personal inbox user interface 300, 500. In another variation, the repository 207 has its own user interface apart from the inbox user interface 300, 500. The system 100 grants a repository user, access to the high-priority message (1108). The repository user may already have access to her own message inbox and to any high-priority messages that might be contained in her message inbox. However, with access to the repository 207, she can read other high-priority messages in the repository 207 that may not have originated from her inbox.

The system 100 may also receive an annotation from the repository user (1110). The annotation, as used herein, refers to any additional information pertaining to the high-priority message such as categories, tags, notes, comments, calendar events, attachments, links, etc. By allowing other repository users to add information this way, the information stored in the repository can organically grow. In aspect, the repository users may have varying degrees of authority to add such annotations to high-priority messages. Once the annotation is received, the system 100 associates the high-priority message with the annotation (1112). In one embodiment, the associated annotations may be also visible in individual inboxes 300, 500. For example, Lucy marks one of her messages as a priority message to be shared with other users via the repository 207. Mark, a repository user, finds Lucy's message on the repository 207 and adds his own comment, "I have dealt with a similar problem before. Contact me if anyone wants to discuss this with me." Mark's comment is now not only available in the repository for any other repository users to view, it is visible in Lucy's own inbox as well, even if she is not authorized to access the repository 207. Lucy reads Mark's comment attached to the message and contacts Mark to solicit advice.

Embodiments within the scope of the present disclosure may also include tangible and/or non-transitory computer-readable storage devices for carrying or having computer-executable instructions or data structures stored thereon. Such tangible computer-readable storage devices can be any available media that can be accessed by a general-purpose or special-purpose computer, including the functional design of any special purpose processor as described above. By way of example, and not limitation, such tangible computer-readable storage devices can include RAM, ROM, EEPROM, CD-ROM, drives or other optical disk storage, magnetic disk storage or other magnetic storage devices, semiconductor-based storage devices, or any other device or medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method comprising:
   receiving, by a microprocessor, via a network, from a plurality communication terminals, a plurality of communications, wherein the plurality of communication comprise at least two different types of communications selected from communication types comprising: a text communication, an audio communication, and a video communication, and wherein the two different types of communications are separate communications from separate communication terminals;
   identifying, by the microprocessor, that the plurality of communications from the plurality of communication terminals are logically related to each other as a plurality of messages of a message thread;
   identifying, by a microprocessor, a usage pattern of a plurality of users on the plurality of communication terminals interacting with the plurality of messages in the message thread;
   analyzing, by the microprocessor, the plurality of messages in the message thread to identify a high-priority message based on the usage pattern;
   generating, by the microprocessor, an instruction to highlight the high-priority message when rendering the message thread on a display; and
   sending, by the processor, the instruction to at least one of the plurality of communication terminals.

2. The method of claim 1,
   wherein usage pattern comprises one of an amount of time spent by the plurality of users viewing each message or a number of times the message has been accessed by the plurality of users.

3. The method of claim 1, wherein the usage pattern further comprises, for each message, an amount of time spent by one or more users accessing the message.

4. The method of claim 1, wherein highlighting the high-priority message comprises changing a position of the high-priority message within the message thread relative to other messages in the plurality of messages.

5. The method of claim 1, wherein highlighting the high-priority message comprises modifying a display attribute of a non-high-priority message in the plurality of messages when rendering the message thread on the display, the display attribute comprising one of a font, a size, a color, or a style.

6. The method of claim 1, wherein highlighting the high-priority message comprises presenting the high-priority message in a collapsed view of the message thread.

7. The method of claim 1, wherein analyzing the plurality of messages yields an analysis, the method further comprising:
receiving, by the microprocessor, input from a user, the input indicating a priority of an associated message in the plurality of messages; and
overriding, by the microprocessor, the analysis and identifying the associated message as the high-priority message.

8. The method of claim 1, the method further comprising:
receiving, by the microprocessor, a command to toggle to a non-prioritized viewing mode; and
based on the command, rendering on the display the message thread without highlighting the high-priority message.

9. The method of claim 1, further comprising:
associating, by the microprocessor, the high-priority message with a repository containing only high-priority messages; and
granting, by the microprocessor, a repository user, access to the high-priority message.

10. The method of claim 1, wherein the usage pattern further comprises an amount of time a sender of the one of the plurality of messages spent drafting one of the plurality of messages.

11. The method of claim 1, wherein the usage pattern is further based on how many times one of the plurality of messages was quoted in the plurality of messages and a quoted portion of the one of the plurality of messages.

12. The method of claim 1, wherein the usage pattern is further based on access by a plurality of recipients of one of the plurality of messages, wherein a different weight is given for access by an intended message recipient versus an access by a Blind Carbon Copied (BCC) message recipient.

13. The method of claim 1, wherein the usage pattern is further based on whether a sender or a recipient of one of the plurality of messages is a repeat loyal customer in a customer service center and wherein a message by the repeat loyal customer is given higher priority in the customer service center.

14. The method of claim 1, wherein the usage pattern is further based on whether one of the plurality of messages comprises an attachment and wherein a priority score for the usage pattern is adjusted based on a type of extension of the attachment.

15. The method of claim 1, wherein the usage pattern is further based on a type formatting of the message as it was originally composed.

16. The method of claim 1, further comprising:
determining that a first message of the plurality of messages was accidentally sent without an attachment;
determining that a second message of the plurality of messages was sent with the attachment;
in response to the first message of the plurality of messages being accidently sent without the attachment and the second message of the plurality of messages being sent with the attachment giving a lower priority to the message sent without the attachment; and
sending an instruction to give the lower priority to the first message without the attachment to at the least one of the plurality of communication terminals.

17. A system comprising:
a microprocessor; and
a computer-readable storage device storing instructions which, when executed by the microprocessor, cause the microprocessor to perform operations comprising:
receiving, via a network, from a plurality communication terminals, a plurality of communications, wherein the plurality of communication comprise at least two different types of communications selected from communication types comprising: a text communication, an audio communication, and a video communication, and wherein the two different types of communications are separate communications from separate communication terminals;
identifying that the plurality of communications from the plurality of communication terminals are logically related to each other as a plurality of messages of a message thread;
identifying a usage pattern of a plurality of users on the plurality of communication terminals interacting with the plurality of messages in the message thread;
analyzing the plurality of messages in the message thread to identify a high-priority message based on the usage pattern;
generating an instruction to highlighting the high-priority message when rendering the message thread on a display; and
sending the instruction to at least one of the plurality of communication terminals.

18. The system of claim 17, wherein highlighting the high-priority message further comprises changing a position of the high-priority message within the message thread relative to other messages in the plurality of messages.

19. The system of claim 17, wherein highlighting the high-priority message further comprises modifying a display attribute of a non-high-priority message in the plurality of messages when rendering the message thread on the display, the display attribute comprising one of a size or color.

20. The system of claim 17, wherein highlighting the high-priority message further comprises presenting the high-priority message in a collapsed view of the message thread.

* * * * *